Figure 1:
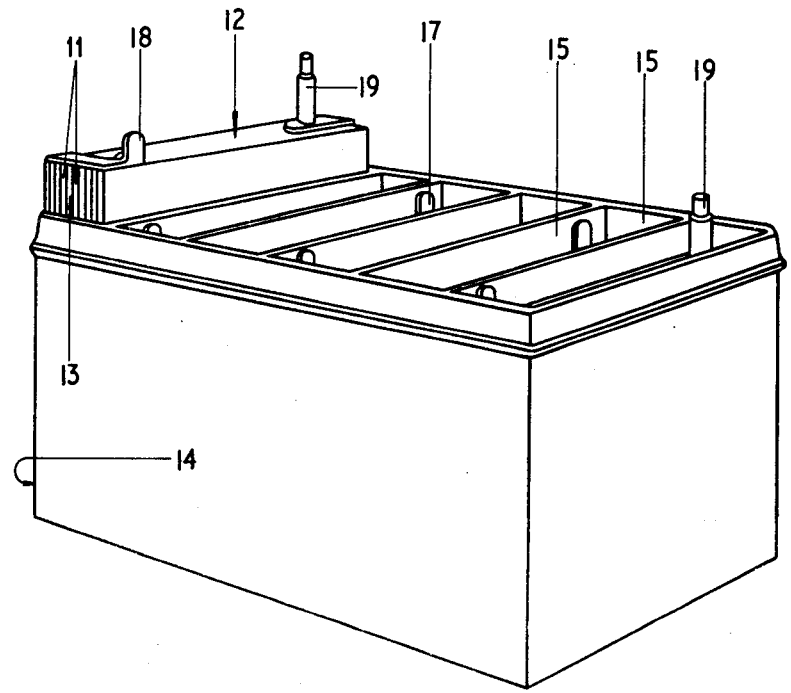

United States Patent [19]

Bant et al.

[11] 4,188,461
[45] Feb. 12, 1980

[54] LEAD-ACID BATTERIES

[75] Inventors: John A. Bant, Solihull; Victor J. Raban, Birmingham, both of England

[73] Assignee: Lucas Industries Limited, Birmingham, England

[21] Appl. No.: 868,784

[22] Filed: Jan. 12, 1978

[30] Foreign Application Priority Data

Jan. 20, 1977 [GB] United Kingdom ............... 2333/77

[51] Int. Cl.² ................ H01M 10/06; H01M 10/44
[52] U.S. Cl. .......................................... 429/48; 429/54; 429/204; 429/225; 204/2.1
[58] Field of Search ................ 429/48, 49, 224–228, 429/118, 110, 54, 204; 204/2.1

[56] References Cited

U.S. PATENT DOCUMENTS

| 1,616,585 | 2/1927 | Lea | 204/2.1 |
|---|---|---|---|
| 3,629,006 | 12/1971 | Hill | 204/2.1 |
| 3,652,341 | 3/1972 | Halsall et al. | 204/2.1 |
| 3,929,505 | 12/1975 | Burkett et al. | 204/2.1 |
| 3,948,680 | 4/1976 | Mao et al. | 429/118 |

FOREIGN PATENT DOCUMENTS 1489182 10/1977 United Kingdom.

Primary Examiner—Anthony Skapars

Attorney, Agent, or Firm—Ladas, Parry, Von Gehr, Goldsmith & Deschamps

[57] ABSTRACT

A method of producing a lead-acid battery capable of activation by the addition of electrolyte thereto, comprises the steps of:

starting with a battery container accommodating at least one pack of battery plate grids having insulating separators interposed between adjacent grids, each of said grids carrying the lead-acid battery paste required to produce a positive or a negative battery plate after conversion of the paste into the active material of the plate. With the grids immersed in an aqueous solution of sulphuric acid, an electric current is passed between the grids so that the solution rises to a temperature in excess of 180° F. but not greater than 210° F., the passage of the electric current converting the paste on the grids to the active material of the plates. The passage of the electric current is ceased when sufficient of the paste has been converted to provide the plates with a charge in excess of 50% of the required final value and the plates are then allowed to stand in said solution for at least 15 minutes. The passage of an electric current is then repeated so as to produce a charge on the plates of the required value, whereafter the sulphuric acid solution is drained from the plates and the container is sealed against the ingress of air.

10 Claims, 2 Drawing Figures

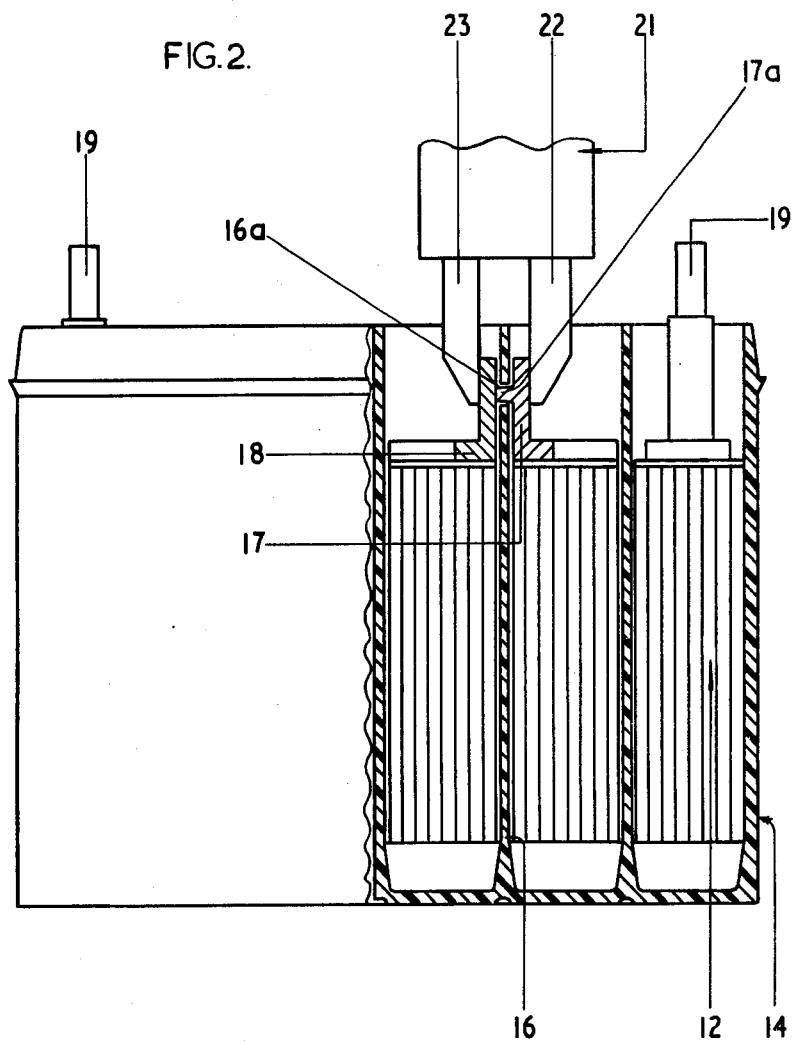

LEAD-ACID BATTERIES

This invention relates to lead-acid batteries.

The invention resides in a method of producing a lead-acid battery capable of activation by the addition of electrolyte thereto comprising the steps of:

(a) starting with battery container accommodating at least one pack of battery plate grids having insulating separators interposed between adjacent grids, each of said grids carrying the lead-acid battery paste required to produce a positive or a negative battery plate after conversion of the paste into the active material of the plate, (b) with the grids immersed in an aqueous solution of sulphuric acid, passing an electric current between the grids so that the solution rises to a temperature in excess of 180° F. but not greater than 210° F., the passage of the electric current converting the paste on the grids to the active material of the plates, (c) ceasing the passage of the electric current when sufficient of the paste has been converted to provide the plates with a charge in excess of 50% of the required final value, then (d) allowing the plates to stand in said solution for at least 15 minutes, then (e) repeating the passage of an electric current so as to produce a charge on the plates of the required value, and thereafter (f) draining the sulphuric acid solution from the plates and then sealing the container against the ingress of air.

Conveniently, at the start of step (b), the aqueous solution of sulphuric acid has a specific gravity of between 1.025 and 1.30.

Preferably, at the start of step (b) the aqueous solution of sulphuric acid has a specific gravity of between 1.10 and 1.26.

Most preferably, at the start of step (b) the aqueous solution of sulphuric acid has a specific gravity of between 1.22 and 1.25.

Preferably, the passage of the electric current is ceased when the plates carry a charge in excess of 90% of the required final value.

Preferably, step (d) is continued for between 45 minutes and 3 hours.

In the accompanying drawings, which illustrate a method, according to one example of the invention, of manufacturing battery plates for a lead-acid battery:

FIG. 1 is a perspective view of a battery box during assembly of packs of battery plate grids and separators into the box, and FIG. 2 is a part sectional view of a battery box illustrating the completion of the intercell connections.

Referring to the drawings, the battery plates are produced from lead alloy grids 11 each of which carries the lead-acid battery paste required to produce a positive or negative battery plate after conversion of the paste into the active material of the plate. The composition of the paste is entirely conventional and will not therefore be described in detail. The grids 11 are first assembled into packs 12 with insulating separators 13 being interposed between the grids 11 and with each pair of adjacent grids in a given pack carrying the paste required to produce a negative battery plate and a positive battery plate respectively.

The packs 12 are then inserted into a battery box 14 which is moulded from a thermoplastic material preferably polypropylene and is divided into six cell compartments 15 by parallel, spaced partition walls 16. Each cell compartment 15 receives a respective pack 12 and in each of the four packs received in the central compartments of the box 14, each grid which is to define a positive plate is connected to a conductive lug 17 and each grid which is to define a negative plate is connected to a conductive lug 18. Each of the lugs 17, 18 includes an integral extension which, in use, extends substantially parallel to the partition walls 16 and each of the lugs 17 is further formed with a projecting spigot 17a integral with its respective extension. Each of the packs 12 which is received in an end compartment of the box 14 has one set of grids connected to a lug 17 or 18 and its other set of grids connected to a terminal post 19.

As shown in FIG. 2, the partition walls 16 have holes 16a stamped therein and arranged so that when the packs 12 are assembled in the box 14, each spigot 17a extends through a respective hole 16a into engagement with the extension of a lug 18 in an adjacent compartment. Of course, it will be appreciated that the partition walls 16 have to be flexed to permit the packs 12 to be positioned in the box 14. When all the packs 12 are in position, the required intercell connections are completed using the resistance welding tool shown at 21 in FIG. 2. The tool 21 includes a pair of electrodes 22, 23 which are engaged in turn with the extensions respectively of each pair of lugs 17, 18 to resistance weld the lugs together. During the resistance welding operation, the electrodes 22, 23 simultaneously press the extensions of the lugs 17, 18 against the respective partition wall 16 and pass current between the extensions through the spigot 17a so that the spigot melts and fills the hole 16a in the partition wall.

When the intercell connections are complete, the box is closed by welding to the box, a battery lid (not shown) which is moulded in a thermoplastic material, again preferably polypropylene, and which has a peripheral edge adapted to engage the top peripheral edge of the box and ribs adapted to engage the tops of the partition walls. Welding is effected by pressing the lid and the top peripheral edge of the box 14 against opposite surfaces respectively of a heater plate (not shown) so that the portions of the lid and the box in contact with the heater plate are melted. The heater plate is then removed and the melted portions of the lid and the box are pressed into engagement so that the lid becomes joined to the box 14.

When the box has been closed by the lid, each cell compartment 15 is filled with forming acid, that is an aqueous solution of sulphuric acid of specific gravity between 1.025 and 1.30 or more preferably between 1.10 and 1.26. Most preferably the specific gravity of the sulphuric acid is between 1.22 and 1.25. Thereafter, the terminal posts 19 are connected to a d.c. source and an electric current is passed between the terminal posts to perform a forming operation on the grids 11 and thereby convert tha paste on the grids 11 into the active material of the plates. Since the paste on the grids is entirely conventional, the passage of current converts the paste on the grids which are to define negative battery plates into metallic lead and converts the paste on the grids which are to define positive plates into lead dioxide. During the forming operation, the temperature and specific gravity of the sulphuric acid within the compartments 15 rises, the magnitude of the current passed between the terminals 19 being arranged so that the temperature of the acid increases to a value in excess of 180° F. but not greater than 210° F. As the forming operation progresses, the charge on the partly formed plates increases and when the charge reaches at least 50% and preferably at least 90% of the required final charge on the plates, the passage of the electric current between the terminals 19 is ceased. In fact, the charge on the plates can be allowed to rise as high as, or beyond, the required final charge before the passage of current is ceased.

During forming the acid solution in the box bubbles vigorously as the gases generated by the forming reactions escape through the apertures which are necessarily provided in the lid to allow filling and venting of the battery in service. This can lead not only to an acid laden mist being expelled through the apertures but also, in extreme conditions, in the acid solution bubbling out of the apertures. It is therefore desirable to provide above each aperture means for collecting any expelled acid and returning it to the box.

When the passage of electric current has been terminated, the battery plates are allowed to stand in the hot aqueous sulphuric acid solution for a period of at least thirty minutes. Normally the period of standing is between forty-five minutes and three hours, the time depending upon the temperature of the acid solution at the end of the passage of the electric current. During standing some discharge of the plates occurs and so, after standing, a further passage of electric current is always carried out, preferably using a current of the same magnitude as used previously, until the plates are fully formed or the charge on the plates is returned to the required final value. The box is then tipped and inverted to allow the sulphuric acid solution to drain from the box through the filling and venting apertures, and in some cases removal of the acid is accompanied by blowing air into the box.

It is to be appreciated that the method described above is intended to produce a drained, charged battery as the finished article, that is a battery which can be stored in a charged condition for a relatively long period of time (up to 2 years) but which must be activated by the addition of electrolyte through the filling and venting apertures before it can be put into service. It is, however, to be understood that, after the draining operation, this type of battery necessarily retains some of the forming acid which normally is for the most part absorbed in the active material of the plates, but which can be free in the bottom of the box provided it is of insufficient depth to electrically connect the plates.

After draining of the forming acid, it is necessary to ensure that the filling and venting apertures provided in the lid are sealed against the ingress of atmosphere. This can be achieved by inserting into each aperture a stopper which isolates each cell compartment from atmosphere. In this case it is important to seal each aperture as rapidly as possible after the final forming stage and to blow air through the box during removal of the acid, since these steps are found to avoid unacceptable pressure rises in the box during storage. Alternatively, each aperture can be sealed with a plug which permits gases generated in the box to vent to atmosphere, but substantially prevents air entering the box. In this case the need to blow air through the box during draining is avoided.

With a drain charged battery, it is of course necessary to ensure that the battery plates do not deteriorate during the relative long periods of storage they are likely to experience. This is achieved in the method described above since during the period of standing the positive plates undergo a chemical reaction which is believed to partially sulphate the positive plates and such that on subsequent charging there is produced an acid resistant form of lead dioxide. The reaction during standing proceeds at a rate dependent upon the temperature of the acid at the time of the first forming operation.

It is to be appreciated that the 2-stage forming operation described above can be performed prior to joining of the lid to the box. Where the forming operation is effected in an unsealed box, it is desirable in a battery manufacturing factory that the formation should be carried out away from the factory floor, such as in a ventilated cubicle, to protect factory personnel from the acid-carrying gases involved during formation. Of course, if such an isolated environment is used for the formation, then the rate of flowing can be safely increased and a large number of batteries can be processed at one time.

Moreover, it is to be understood that in the method described above, after draining of the forming acid, the battery can temporarily be filled with a stronger sulphuric acid solution than the forming acid. The stronger acid is subsequently drained from the battery but, since some of the acid is necessarily retained, the result is that eventual activation of the battery can be effected with lower S.G. acid than would otherwise be necessary.

We claim:

1. A method of producing a lead-acid battery capable of activation by the addition of electrolyte thereto, comprising the steps of:
    (a) starting with battery container accommodating at least one pack of battery plate grids having insulating separators interposed between adjacent grids, each of said grids carrying the lead-acid battery paste required to produce a positive or a negative battery plate after conversion of the paste into the active material of the plate,
    (b) with the grids immersed in an aqueous solution of sulphuric acid, passing an eletric current between the grids so that the solution rises to a temperature in excess of 180° F. but not greater than 210° F., the passage of the electric current converting the paste on the grids to the active matrial of the plates,
    (c) ceasing the passage of the electric current when sufficient of the paste has been converted to provide the plates with a charge in excess of 50% of the charge present when the battery is fully charged, then
    (d) allowing the plates to stand in said solution for at least 15 minutes, then
    (e) repeating the passage of an electric current so as to bring the plates to fully charged condition, and thereafter
    (f) draining the sulphuric acid solution from the plates and then sealing the container against the ingress of air.

2. A method as claimed in claim 1 wherein, at the start of step (b), the aqueous solution of sulphuric acid has a specific gravity of between 1.025 and 1.30.

3. A method as claimed in claim 1 wherein, at the start of step (b) the aqueous solution of sulphuric acid has a specific gravity of between 1.10 and 1.26.

4. A method as claimed in claim 1 wherein, at the start of step (b) the aqueous solution of sulphuric acid has a specific gravity of between 1.22 and 1.25.

5. A method as claimed in claim 1 wherein the passage of the electric current is ceased when the plates carry a charge in excess of 90% of the charge present when the battery is full charged.

6. A method as claimed in claim 1 wherein step (d) is continued for between 45 minutes and 3 hours.

7. A method as claimed in claim 1 wherein the container includes a battery box which is closed by lid and which is divided by partition walls into a plurality of cell compartments each containing one of said packs of battery plate grids and separators, the lid being formed with apertures which communicate with the cell compartments respectively and through which said sulphuric acid is drained, and the apertures being sealed against the ingress of air in step (d).

8. A lead-acid battery capable of storage by the addition of electrolyte thereto produced by a method as claimed in claim 1.

9. A method of producing a lead-acid battery capable of activation by the addition of electrolyte thereto, comprising the steps of:
  (a) starting with battery container accommodating at least one pack of battery plate grids having insulating separators interposed between adjacent grids, each of said grids carrying the lead-acid battery paste required to produce a positive or a negative battery plate after conversion of the paste into the active material of the plate,
  (b) with the grids immersed in an aqueous solution of sulphuric acid, passing an electric current between the grids so that the solution rises to a temperature in excess of 180° F. but not greater than 210° F., the passage of the electric current converting the paste on the grids to the active material of the plates,
  (c) ceasing the passage of the electric current, then
  (d) allowing the plates to stand in said solution for at least 15 minutes, then
  (e) repeating the passage of an electric current so as to bring the plates to fully charged condition, and thereafter
  (f) draining the sulphuric acid solution from the plates and then sealing the container against the ingress of air.

10. A method of producing a lead-acid battery capable of activation by the addition of electrolyte thereto, comprising the steps of:
  (a) starting with battery container accommodating at least one pack of battery plate grids having insulating separators interposed between adjacent grids, each of said grids carrying the lead-acid battery paste required to produce a positive or a negative battery plate after conversion of the paste into the active material of the plate,
  (b) with the grids immersed in an aqueous solution of sulphuric acid, passing an electric current between the grids so that the solution rises to a temperature in excess of 180° F. but not greater than 210° F. and the paste on the grids is converted to the active material of the plates,
  (c) ceasing the passage of the electric current when at least 50% of the paste has been converted to the active material of the plates, then
  (d) allowing the plates to stand in said solution for at least 15 minutes, then
  (e) repeating the passage of an electric current so as to bring the plates to fully charged condition, and thereafter
  (f) draining the sulphuric acid solution from the plates and then sealing the container against the ingress of air.

* * * * *